United States Patent [19]

Heck et al.

[11] 4,126,453

[45] Nov. 21, 1978

[54] COMPOSITION FOR A FLUIDIZING FLUX IN THE PRODUCTION OF IRON AND STEEL

[75] Inventors: Willis A. Heck, Brackenridge; Roy E. Ferree, Valencia, both of Pa.

[73] Assignee: ESM, Inc., Valencia, Pa.

[21] Appl. No.: 812,700

[22] Filed: Jul. 5, 1977

Related U.S. Application Data

[60] Continuation of Ser. No. 687,097, May 17, 1976, abandoned, which is a division of Ser. No. 330,961, Feb. 9, 1973, Pat. No. 3,982,929.

[51] Int. Cl.² .............................................. C22B 9/10
[52] U.S. Cl. .......................................... 75/257; 75/53
[58] Field of Search .................... 75/257, 53, 54, 55, 75/27

[56] References Cited

U.S. PATENT DOCUMENTS

| | | | |
|---|---|---|---|
| 2,698,784 | 1/1955 | Timmins | 75/54 |
| 2,791,816 | 5/1957 | Pletsch | 75/27 |
| 3,802,865 | 4/1974 | Ohkubo | 75/53 |

Primary Examiner—P. D. Rosenberg
Attorney, Agent, or Firm—Stanley J. Price, Jr.; John M. Adams

[57] ABSTRACT

A composition for use as a basic flux to aid in obtaining slag fluidity in the production of iron and steel that includes a mixture, as expressed by percentage weight, of iron oxide in the range of 20 to 80%, aluminum in the range of 2 to 80%, and silica in the range of 5 to 60%. A composition for use as an acid flux to aid in obtaining slag fluidity in the production of iron and steel that includes a mixture, as expressed by percentage weight, of sodium oxide in the range of 5 to 50%, aluminum in the range of 2 to 60%, and silica in the range of 20 to 80%. The slag fluidizing ingredients are prereacted forming shaped bodies or powders which are then added as acid and basic fluxes to the steel making furnaces for the purpose of fluidizing the slag thus formed in order to separate and remove the slag from molten metal.

7 Claims, No Drawings

COMPOSITION FOR A FLUIDIZING FLUX IN THE PRODUCTION OF IRON AND STEEL

CROSS REFERENCES TO RELATED APPLICATIONS

This application is a continuation of co-pending application Ser. No. 687,097 filed May 17, 1976, now abandoned entitled "Composition For A Fluidizing Flux In The Production Of Iron and Steel" which in turn is a division of application Ser. No. 330,961 filed on Feb. 9, 1973, entitled "Composition For Fluidizing Flux In The Production Of Iron And Steel" now U.S. Pat. No. 3,982,929.

BACKGROUND OF THE INVENTION

1. Field of the Invention

This invention relates to flux compositions for use in the production of iron and steel and more particularly to acid and basic flux compositions for use in obtaining slag fluidity in the production of iron and steel.

2. Description of the Prior Art

In the process of refining metal for the use in the production of iron or steel difficulties have been encountered in the past in separating the impurities, which are chemically combined and physically mixed with the metal, from the molten metal in the furnace. In order to purify the metal ore, the metal has been separated from the impurities in the metal ore by fusion. To render the impurities more easily fusible, fluxing agents have been added to the molten metal in the furnace or converter through the refining process. It has been a further function of fluxing agents to reduce the viscosity of slag and increase slag fluidity.

Initially, many different fluxing agents were employed to remove the impurities contained in the ores which were to be refined for the formation of slag and further to increase the fluidity of the slag for its separation from the molten metal. For example, U.S. Pat. No. 91,324 discloses the use of fluorspar and horse manure with wood and carbon in combination for the purpose of smelting iron, gold, silver, and copper ores in the manufacture of iron, steel, and brass. U.S. Pat. No. 120,099 discloses a flux composed of broken glass, pulverized charcoal, and calcined shells combined with soda ash or carbonate of soda and silicous sand to be used in the reduction of ores in refining of metals. U.S. Pat. No. 145,580 teaches fluxes for treating ores and metals composed of borax with silica in the form of infusorial earth or silicous diatoms, and chlorine of sodium together with the necessary quantity of powdered fluorspar or dolomite compressed into grains, pellets, or bricks as desired. The flux composition causes the slag to be very fluid and aids in removing deleterious materials, such as phosphorus and sulfur.

U.S. Pat. No. 465,314 provides a process of manufacturing steel wherein phosphorus, sulfur, and other impurities are removed from the iron and other ores by the employment of chemical products introduced into a smelting furnace. The chemical composition employed in the steel making furnace to remove the impurities in the metal includes a mixture of silica, alumina, iron oxide, phosphoric acid, carbonate of lime, and manganese oxide.

More recently fluxing compositions for use in metallurgical purification operations have been prepared to include fluorspar, magnesium, and calcium compounds as found in the form of dolomite and iron oxides to lower the viscosity of the slag material produced. In the steel making process as taught in U.S. Pat. No. 3,645,719 calcium oxide and magnesium oxide in the form of dolomite are prereacted with iron oxide to form shaped bodies of dicalcium ferrite. The dicalcium ferrite bodies are added to the furnace of the steel making process as a basic slag forming ingredient for the improved removal of phosphorus and sulphur. Great Britain Pat. No. 1,258,102 teaches artificial self-fluxing slag forming agents made by mixing the ingredients in a fine powder form and baking the ingredients into lumps which are then blown into the converter for forming slag. The first slag forming agent is comprised of a mixture of calcium oxide, ferric oxide, and silica. The second slag forming agent includes a mixture selected from aluminum oxide, calcium fluoride, titanium oxide, magnesium oxide, manganese oxide, and alkali metal oxides. In addition, U.S. Pat. No. 3,309,196 provides a fluxing agent for the purpose of making slags more fusible in the reduction of oxidized iron material. An acid flux is provided as pellets in agglomerated particulate form for metallurgical fluxing consisting essentially of calcium oxide in the form of lime, sodium oxide in the form of soda ash, aluminum oxide, and silica in the form of sand. Also, a basic fluxing agent is provided in pellets of agglomerated particulate form consisting essentially of lime, aluminum, soda ash, silica, and iron oxide.

Generally, it has been the practice to employ fluorspar as a source of calcium fluoride, $CaF_2$, as a fluxing agent to make slag more fusible in the purification process. It has been found, however, the fluorspar when used as a fluxing agent combines with the impurities in the molten metal to produce slag that corrosively reacts with the refractory material composing the lining of the furnace of the converter thereby reducing the furnace lining life. There is need for a flux composition that protects the refractory material composing the furnace lining, of a converter from corrosive action of the slag. Further, there is need to provide a fluidizing flux having a composition which increases the fluidity of slag without the presence of florides in the flux composition.

SUMMARY OF THE INVENTION

This invention relates primarily to flux compositions for use in the iron and steel making processes. By adding the flux compositions to the molten metal in a steel furnace or converter, impurities are separated from the molten metal in slag form. The action of the fluxes with the impurities reduce the viscosity of the impurities for the purpose of making slags more fusible and easily removable from their mechanical mixture with the molten metal. The composition of a basic flux consists essentially of an admixture, expressed by percentage weight, of iron oxide, in the form of $Fe_2O_3$ or $Fe_3O_4$ in the range of 20 to 80%, powdered metallic aluminum or aluminum oxide, $Al_2O_3$, in the range of 2 to 80%, and silica in the range of 5 to 60%. The composition of an acid flux consists essentially of an admixture, expressed by percentage weight, of sodium or sodium compounds in the range of 5 to 50%, powdered metallic aluminum or aluminum oxide, $Al_2O_3$, in the range of 2 to 60% and silica $SiO_2$, in the range of 20 to 80%.

The acid and basic flux ingredients are admixed in the conventional manner to form spheroidal particles. Generally, the ingredients are mixed together in dry powder form in the proportions by weight as hereinabove described. Water is then added to form an aqueous solution which is agglomerated by heating the mixture in a rotary kiln. After heating for a desired period of time, the agglomerates are dried by sintering in a kiln or furnace. Spheroidal particles can also be formed by the continuous addition of the aqueous solution to an agglomerator. The heat of reaction from the aqueous solution is sufficient to produce dry spheriodal particles having sufficient structural strength to withstand future handling. Conventional binding compositions comprising $B_2O_7$, $P_2O_5$ and water may be employed to give the spheroidal bodies sufficient rigidity and structural strength to resist the stresses applied to the bodies during handling and mixing with the molten metal.

By using a basic flux comprising a high concentration of iron oxide, an increase in the metal yield of the purified metal in the furnace is provided. The high iron content flux separates less iron from the molten ore in the furnace resulting in an increased metal yield in the purified molten metal as compared to the metal yield achieved when a low iron content flux is employed. However, it may be desired, in other instances to provide a purified molten metal which is low in iron content or one in which no iron is provided in the flux composition, as in the case of the acid flux composition.

Accordingly, the principal object of this invention is to provide a fluidizing flux for use in iron and steel making that increases slag fluidity by making impurities more fusible for separation from the purified molten metal.

It is another object of this invention to provide a fluidizing flux composition that does not include calcium or fluoride compounds.

It is a further object of this invention to provide a fluidizing flux, for use in the iron and steel making processes, which controls the metal yield of the purified metal.

Still another object of this invention is to provide a fluidizing flux composition in the iron and steel making processes that substantially reduces the damage to the furnace lining generally caused by the corrosive action of the fused slag produced when it reacts with the refractory material composing the lining.

DESCRIPTION OF THE PREFERRED EMBODIMENTS

Basic Fluidizing Fluxes

In a basic steel making process a basic fluidizing flux for separation of acid slag from molten metal includes, as expressed by percentage weight, 20 to 80% iron oxides, such as, $Fe_2O_3$ or $Fe_3O_4$, 2 to 80% aluminum oxides or powdered metallic aluminum oxides, such as, $Al_2O_3$ or powdered metallic aluminum, and 5 to 60% oxides of silica preferably in the form of sand or other silicate compounds. The ingredients are mixed together as a dried powder in the manner hereinabove described. The composition is used as a basic flux to be added to a furnace in the iron or steel making process to combine with the impurities for the formation of slag. The following examples illustrate this invention, but are not intended as a limitation thereof.

EXAMPLE 1

A basic fluidizing flux was formed by admixing, by percentage weight, the ingredients comprising 50% iron oxide, 25% powdered metallic aluminum, and 25% silica. Spheroidal particles of the basic flux composition were added to a steel making furnace containing molten ore. The basic flux reacting with the acid impurities of the molten ore effectively separated them as an acid compound from the molten metal. The fluidized slag was mechanically removed from its mixture with the purified molten metal with no damage to the furnace lining caused by the corrosive action of the fused slag.

EXAMPLE 2

A basic fluidizing flux composition was formed by the admixing, expressed by percentage weight, of 80% iron oxide, 15% powdered metallic aluminum and 5% silica. The procedure of Example 1 was repeated wherein the basic fluidizing flux in spheroidal particle form was added to the steel making process to form slag with the impurities in the molten metal for subsequent removal of the impurities from the molten metal.

EXAMPLE 3

A basic fluidizing flux composition was formed, as expressed by percentage weight, by the admixing of 20% iron oxide, 20% powdered metallic aluminum, and 60% silica. The procedure of Example 1 was again repeated and the basic fluidizing flux composition demonstrated superior capability in lowering the viscosity of the slag produced to thereby increase slag fluidity for the removal of the slag from the purified molten metal.

Acid Fluidizing Fluxes

In a basic steel making process an acid fluidizing flux for separation of basic slag from molten metal includes, as expressed by percentage weight, 5 to 50% sodium or sodium compounds preferably in the form of sodium carbonate, $Na_2CO_3$, and sodium silicate, $Na_2SiO_3$, 20 to 80% silica preferably in the form of sand or other silicate compounds, and 2 to 60% powdered metallic aluminum or aluminum oxide, $Al_2O_3$. The ingredients are mixed together as a dried powder in the manner hereinabove described forming the composition for use as an acid flux to be added to a furnace in the steel making process to combine with the impurities for the formation of slag. The following examples illustrate this invention, but are not intended as a limitation thereof.

EXAMPLE 1

An acid fluidizing flux was formed by admixing, by percentage weight, the ingredients comprising 5% sodium silicate, $Na_2SiO_3$, 35% silica, and 60% powdered metallic aluminum. Spheroidal particles of the acid flux composition were added to a steel making furnace containing molten ore. The acid flux reacting with the basic impurities of the molten ore effectively separated them as a basic compound from the molten metal. The fluidized slag was mechanically removed from its mixture with the purified molten metal with no damage to the furnace lining caused by the corrosive action of the fused slag.

EXAMPLE 2

An acid fluidizing flux composition was formed by the admixing, expressed by percentage weight, of 50% sodium carbonate, $Na_2CO_3$, 30% silica, and 20% powdered metallic aluminum. The procedure of Example 1 was repeated wherein the acid fluidizing flux in spheroidal particle form was added in the steel making process to form slag with the impurities in the molten metal for subsequent removal therefrom.

EXAMPLE 3

An acid fluidizing flux composition was formed, as expressed by percentage weight, by the admixing of 25% sodium carbonate, $Na_2CO_3$, 40% silica, and 35% powdered metallic aluminum. The procedure of Example 1 was again repeated and the acid fluidizing flux composition demonstrated superior capability in lowering the viscosity of the slag produced to thereby increase slag fluidity for the removal of the slag from the purified molten metal.

According to the provisions of the patent statutes, we have explained the principal, preferred construction, and mode of operation of our invention, and have illustrated and described what we now consider to represent its best embodiments. However, we desire to have it understood that, within the scope of the appended claims, the invention may be practiced otherwise than as specifically illustrated and described.

We claim:

1. A basic fluidizing flux composition to reduce the viscosity of the impurities during the production of iron and steel and provide a more fusible slag consisting essentially of discrete substantially spherical particles formed by agglomerating an admixture of particulate iron oxides in an amount of about 20–80 percent by weight, aluminum and aluminum oxides in an amount of about 2–80 percent by weight, and silica in an amount of about 5–60 percent by weight.

2. The composition as set forth in claim 1 wherein said iron oxide is about 50 percent by weight, said aluminum is about 25 percent by weight, and said silica is about 25 percent by weight of said admixture.

3. The composition as set forth in claim 1 wherein said iron oxide is about 80 percent by weight, said aluminum is about 15 percent by weight, and said silica is about 5 percent by weight of said admixture.

4. The composition as set forth in claim 1 wherein said iron oxide is about 20 percent by weight, said aluminum is about 20 percent by weight and said silica is about 60 percent by weight of said admixture.

5. A process for separating acid impurities from a molten metal comprising,
   admixing pulverulent materials consisting essentially of iron oxides in an amount of between about 20–80 percent by weight, aluminum and aluminum oxides in an amount of between 2–80 percent by weight and silica in an amount of between about 5–60 percent by weight,
   agglomerating said admixed pulverulent materials into discrete substantially spherical particles,
   introducing said spherical particles into a molten metal bath,
   reacting said spherical particles with the acid impurities of the molten metal in said molten metal bath, and
   removing said acid impurities as an acid compound from said molten metal bath.

6. A process for separating acid impurities from a molten metal as set forth in claim 5 which includes,
   forming an aqueous slurry of said pulverulent materials,
   introducing said aqueous slurry into a rotary kiln,
   agglomerating said materials in said rotary kiln to form spherical particles, and
   thereafter drying said spherical particles.

7. A process for separating acid impurities from a molten metal as set forth in claim 5 which includes,
   forming a slag of said acid impurities having a reduced viscosity, and
   removing said slag from said molten metal bath.

* * * * *